(12) United States Patent
Brack et al.

(10) Patent No.: US 7,898,679 B2
(45) Date of Patent: Mar. 1, 2011

(54) METHOD AND SYSTEM FOR SCHEDULING JOBS IN A COMPUTER SYSTEM

(75) Inventors: Martin R. Brack, Garland, TX (US); Donald J. Simmons, Flower Mound, TX (US)

(73) Assignee: Computer Associates Think, Inc., Islandia, NY (US)

( * ) Notice: Subject to any disclaimer, the term of this patent is extended or adjusted under 35 U.S.C. 154(b) by 1662 days.

(21) Appl. No.: 11/139,335

(22) Filed: May 27, 2005

(65) Prior Publication Data

US 2006/0268321 A1    Nov. 30, 2006

(51) Int. Cl.
*G06F 15/00* (2006.01)
*G06F 15/16* (2006.01)
(52) U.S. Cl. ..................... 358/1.15; 709/203
(58) Field of Classification Search ............. 358/1.16, 358/1.15, 1.13, 1.14, 1.12, 1.2; 709/203, 709/223, 218; 711/170, 115, 154; 719/329, 719/314, 313, 319, 320; 715/234, 255, 221, 715/224
See application file for complete search history.

(56) References Cited

U.S. PATENT DOCUMENTS

| | | | |
|---|---|---|---|
| 5,832,262 A | | 11/1998 | Johnson et al. |
| 5,867,636 A * | | 2/1999 | Walker ................ 358/1.15 |
| 7,376,693 B2 * | | 5/2008 | Neiman et al. ............ 709/201 |
| 2001/0015812 A1 * | | 8/2001 | Sugaya ................ 358/1.1 |
| 2002/0063886 A1 * | | 5/2002 | Johnson ................ 358/1.15 |
| 2003/0016388 A1 * | | 1/2003 | Christodoulou et al. .... 358/1.15 |
| 2006/0193006 A1 * | | 8/2006 | Lawrence et al. ......... 358/1.16 |

FOREIGN PATENT DOCUMENTS

EP    0 384 635    1/2002

OTHER PUBLICATIONS

PCT International Search Report (PCT/US2006/019231) mailed Oct. 12, 2006 (11 pages).
Limaye K., Leangsuksun, B., Munganuru V., Greenwood, Z., Scott, S., Libby, Richard and Chanchio, K.; *Grid-Aware HA-OSCAR*; IEEE, pp. 333-339; XP010800349.
D. Wooning: *The Artaras Job Scheduler for Multicomputers*; pp. 1-68; XP002400429.

* cited by examiner

*Primary Examiner*—Saeid Ebrahimi Dehkordy
(74) *Attorney, Agent, or Firm*—Baker Botts L.L.P.

(57) ABSTRACT

A method for scheduling jobs in a computer system includes storing a plurality of job queue files in a random access memory, accessing at least one of the job queue files stored in random access memory, and scheduling, based in part on the at least one job queue file, execution of a job associated with the at least one job queue file. In a more particular embodiment, a method for scheduling jobs in a computer system include storing a plurality of job queue files in a random access memory. The plurality of job queue files include information associated with at least one job. The method also includes storing the information external to the random access memory and accessing at least one of the job queue files stored in the random access memory. The method also includes scheduling, based at least in part on the at least one job queue file, execution of a job associated with at least one job queue file. In response to the scheduling, the method includes updating the information stored in the job queue file and random access memory and the information stored external to the random access memory.

16 Claims, 5 Drawing Sheets

|  | 510 | 512  520 | 530 |
|---|---|---|---|
|  | ANCHOR NAME | JOB A |  |
|  | X TRIGGERS Y | JOB A | JOB B |
|  | ANCHOR NAME | JOB B |  |
|  | X IS TRIGGERED BY Y | JOB B | JOB A |
|  | ANCHOR NAME | DATASET 1 |  |
|  | X TRIGGERS Y | JOB B | DATASET 1 |
|  | X IS TRIGGERED BY Y | DATASET 1 | JOB B |
|  | ANCHOR NAME | JOB C |  |
|  | X TRIGGERS Y | JOB A | JOB C |
|  | X IS TRIGGERED BY Y | JOB C | JOB A |
|  | ANCHOR NAME | DATASET 2 |  |
|  | X TRIGGERS Y | JOB C | DATASET 2 |
| 518 → | X IS TRIGGERED BY Y | DATASET 2 | JOB C |
|  | ANCHOR NAME | JOB X |  |
|  | X TRIGGERS Y | DATASET 2 | JOB X |
|  | X IS TRIGGERED BY Y | JOB X | DATASET 2 |
|  | ANCHOR NAME | JOB D |  |
| 522 → | X TRIGGERS Y | JOB A | JOB D |
|  | X IS TRIGGERED BY Y | JOB D | JOB A |
| 516 → | X HAS A SUCCESSOR OF Y | DATASET 1 | JOB X |
|  | X HAS A PREREQUISITE OF Y | JOB X | DATASET 1 |
|  | X IS A PREREQUISITE OF Y | JOB D | JOB X |
| 514 → | X HAS A PREREQUISITE OF Y | JOB X | JOB D |
|  |  |  |  |

*FIG. 4A*

METHOD AND SYSTEM FOR SCHEDULING JOBS IN A COMPUTER SYSTEM

TECHNICAL FIELD OF THE INVENTION

This invention relates generally to computer systems and more particularly to a method and system for scheduling jobs in a computer system.

BACKGROUND OF THE INVENTION

Computers are pervasive in today's society. Large computer systems are often referred to as "mainframe" computers and have the capability of executing numerous tasks, often referred to as jobs, at the same time. Often customers of such a computer system desire certain jobs to be executed at certain times while other jobs may occur at times that are not predetermined. Thus, many computer systems use job schedulers to control when jobs are executed.

One example of such a scheduler is the Computer Associates Unicenter CA-7 Job Manager. In that system, a job manager accesses queue files regarding the status of certain jobs. In one example, the queue files include a request queue, a ready queue, an active queue, a prior run queue, and other miscellaneous queues. The request queue is a "look ahead" queue that includes prerequisites that must occur before a particular job may be executed. An example of a prerequisite is that another job must complete running before the next job is executed, or that a particular data set must be created before a job may be executed. The ready queue stores jobs that are ready for execution but that might have to wait to be executed due to some system requirement, such as waiting for the availability of a tape drive. The active queue stores jobs that are active, and the prior run queue stores jobs that have executed properly.

One problem with the above-described system is the time that is required to access the queue files. It is often time consuming to locate the files stored on disk, read the disks, and to transmit the read information back to the job manager.

SUMMARY

According to one embodiment, a method for scheduling jobs in a computer system includes storing a plurality of job queue files in a random access memory, accessing at least one of the job queue files stored in random access memory, and scheduling, based in part on the at least one job queue file, execution of a job associated with the at least one job queue file.

In a more particular embodiment, a method for scheduling jobs in a computer system include storing a plurality of job queue files in a random access memory. The plurality of job queue files include information associated with at least one job. The method also includes storing the information external to the random access memory and accessing at least one of the job queue files stored in the random access memory. The method also includes scheduling, based at least in part on the at least one job queue file, execution of a job associated with at least one job queue file. In response to the scheduling, the method includes updating the information stored in the job queue file and random access memory and the information stored external to the random access memory.

Some embodiments of the invention provide numerous technical advantages. Some, none, or all embodiments of the invention may benefit from the below-described advantages. According to one embodiment, a system and method are provided that reduce access time to backup queue files, allowing for removal of bottlenecks and more rapid scheduling of jobs. In addition, according to one embodiment, potential data loss may also be avoided in the event of a power outage.

Other advantages will be readily apparent to one of skill in the art.

BRIEF DESCRIPTION OF THE FIGURES

For a more complete understanding of the present invention and its advantages, references now made to the following description, taken in conjunction with the accompanying drawings, in which.

DETAILED DESCRIPTION OF EXAMPLE EMBODIMENTS

Embodiments of the present invention and its advantages are best understood by referring to FIGS. 1A through 4B of the drawings, like numerals being used for like and corresponding parts of the various drawings.

Figure 1A:
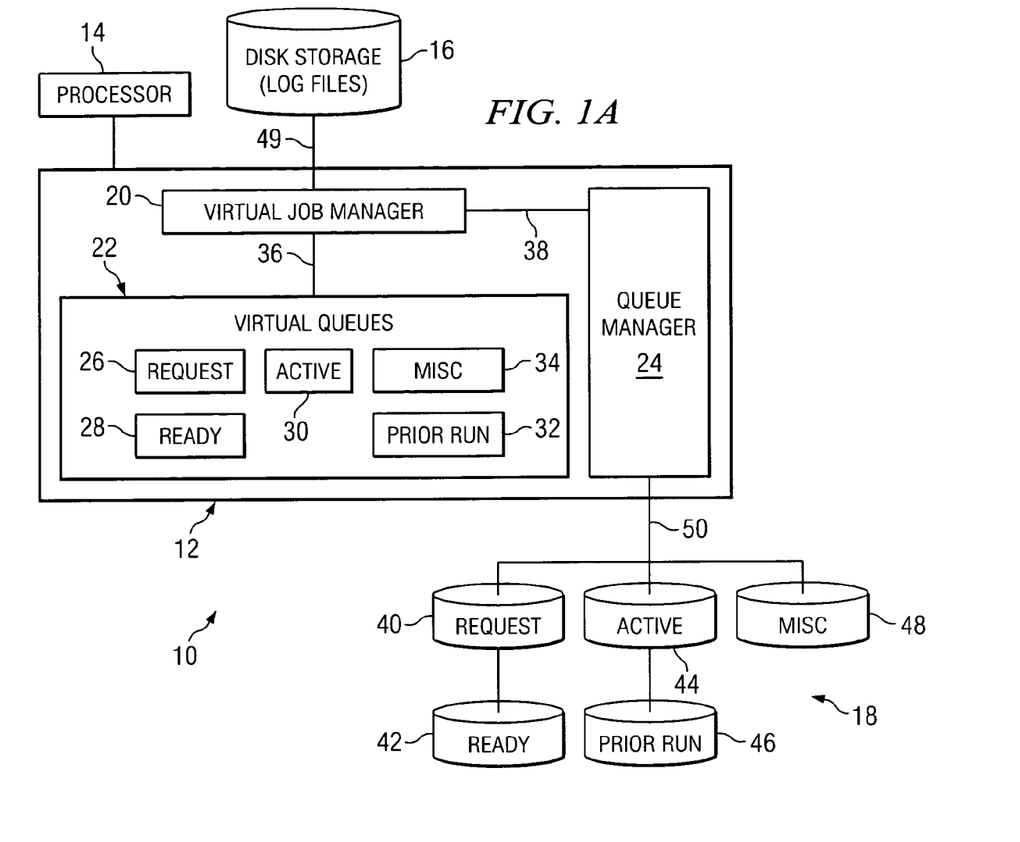
FIG. 1A is a block diagram illustrating a system for scheduling jobs in a computer system according to the teachings of the invention.

FIG. 1A is a block diagram illustrating a system 10 for scheduling jobs in a computer system according to the teachings of the invention. System 10 may be included as part of a "mainframe" computer system, however, system 10 may also be part of less-extensive computer systems. System 10 includes virtual storage 12, an associated processor 14, a log file 16, and a plurality of backup queue files 18.

Processor 14 may be any suitable processor operable to execute computer programs. As one example, processor 14 is a processor compatible with the IBM z/OS operating system for mainframe computers; however, any suitable processor may be used.

Log file 16, which may be stored in disk, tape, or other suitable format, generally stores, in one embodiment, a log of events that occur regarding jobs executed on processor 14. For example, log file 16 stores the fact that execution of a particular job started at a particular time and execution of a particular job ended at a particular time. Log file 16 may also store the fact that a job completed normally or abnormally and may include additional information regarding any abnormal termination. Log file 16 is updated based on commands received from virtual job manager 20 over link 49. Link 49 may be any suitable communication link. In one example, in contrast to virtual queue files 22, log file 16 does not include a listing of particular jobs, such as a listing of all active jobs, but rather includes a listing of events from which a listing of particular jobs executing could be generated. Log file 16 is often used to bring system 10 back to the last state of operation in the event of a power failure, as described in greater below in conjunction with FIG. 1C.

Virtual storage 12 comprises random access memory, which is often referred to as virtual memory in the context of a "mainframe" computer. This is in contrast to disk memory or tape storage. In one example, virtual storage 12 comprises a plurality of memory chips providing multi-gigabyte storage. Virtual storage, or RAM storage, is often referred to as core memory and is conventionally volatile memory, meaning the data in the memory is lost when the memory loses power. An operating system such as IBM z/OS (not explicitly shown) may be stored in virtual storage 12 in the system of FIG. 1A. Virtual memory 12 includes a virtual job manager 20, virtual queues 22, and a queue manager 24.

Virtual storage 12 stores virtual job manager 20, a plurality of virtual queue files 22, and a queue manager 24. Virtual job manager 20 is stored in virtual storage 12 and performs tasks associated with scheduling jobs in a similar manner to conventional job managers. One example of a conventional job manager is Unicenter CA-7 Job Manager from Computer Associates. In general, virtual job manager 20 accesses information regarding jobs from virtual queues 22 and schedules their execution on processor 14. Examples of different jobs that may be running include generation of reports and testing an application. Conventionally, hundreds of jobs may be running at the same time in a mainframe computer system. Additional details regarding the operation of virtual job manager 20 are described in greater detail below.

Virtual queue files 22 include a request queue 26, a ready queue 28, an active queue 30, a prior run queue 32, and miscellaneous queues 34. Virtual queue files 22 generally store information regarding the status of a plurality of jobs that is used by virtual job manager 20 in scheduling execution of the jobs on processor 14. Although particular job queues are illustrated, the teachings of the invention are applicable to job queues other than those illustrated. In this example, request queue 26 looks ahead at jobs that will be executed in the future. Request queue 26 may include information such as the prerequisites that must be completed before a particular job may be executed. Such prerequisites may include other jobs that need to be executed prior to the particular job being executed as well as data sets that must be generated before a particular job is executed. Ready queue 28, in one example, may store a plurality of jobs that are ready for execution, except that certain hardware requirements may not be currently met. For example, a job may be ready for execution except that it is waiting for a tape drive to become available for computer system 10. Active queue 30 stores a plurality of jobs that are currently executing. Prior run queue 32 stores a plurality of jobs that have previously been executed and completed properly. Miscellaneous queues 34 may include a plurality of queues such as a pre-process queue, a post-process queue, and a trailer queue. Other queues may also be utilized.

In determining when to execute various jobs, virtual job manager 20 accesses the information in virtual queue files 22. Conventionally, virtual queue files were not used. Rather queue files stored in disk external of virtual storage 12 were utilized to store this information. Thus, a job manager would have to find the location on the disk where the relevant queue file is stored, read the disk, and transmit the information into virtual storage. The teachings of the invention recognize that these tasks take significant amounts of time as compared to the time it would take to perform these tasks if such information were stored in virtual queue files 22 within virtual storage 12. Thus, according to the teachings of the invention, virtual queue files 22 are stored within virtual storage 12, allowing for rapid access by virtual job manager 20.

The teachings of the invention also recognize that storing the information in virtual queue files 22 may result in the loss of valuable information in the event of a power failure associated with computer system 10. Thus, according to the teachings of the invention, backup queue files 18 are provided that may be stored on disk, tape, or other media that is not as susceptible to a power failure as virtual storage 12. The teachings of the invention recognize that the speed offered through virtual queue files 22 may be combined with the reliability of backup queue files 18 by providing a queue manager 24 in virtual storage that updates backup queue files 18 such that they accurately reflect the current status of virtual queue files 22.

When virtual job manager 20 schedules a job, virtual job manager communicates with particular virtual queue files 22 over link 36 and updates those files appropriately. Link 36 may be any suitable communication link. In addition, virtual job manager 20 communicates with queue manager 24 over link 38, commanding queue manager 24 to update backup queue files 18 appropriately. Thus, according to the teachings of the invention, virtual queues 22 and backup queue files 18 contain essentially the same information regarding the status of jobs associated with computer system 10.

Queue manager 24 receives a command from virtual job manager 20 over link 38 and communicates with queue files 18 over link 50 to update backup queue files 18 appropriately. In one embodiment, queue manager 24 performs the same function in updating backup queue files 18 as virtual job manager 20 performs in updating virtual queue files 22. In one embodiment, updating backup queue files 18 occurs more slowly than updating virtual queue files 22 because of the inherent delay associated with the writing to disk or tape memory. However, this delay is not problematic because it does not delay scheduling of jobs by virtual job manager 20, but only delays updating of backup queue files 18. As described in greater detail below, any discrepancies between backup queue files 18 and virtual queue files 22 may be addressed by reference to log file 16.

Backup queue files 18 include, in this embodiment, a request queue 40, a ready queue 42, an active queue 44, a prior run queue 46, and miscellaneous queues 48. Backup queue files 18 may be substantially similar to virtual queue files 22 described above, except that backup queue files 18 are stored external to virtual memory 12. In particular embodiments, backup queue files 18 are stored in disk or tape storage.

Figure 1B:
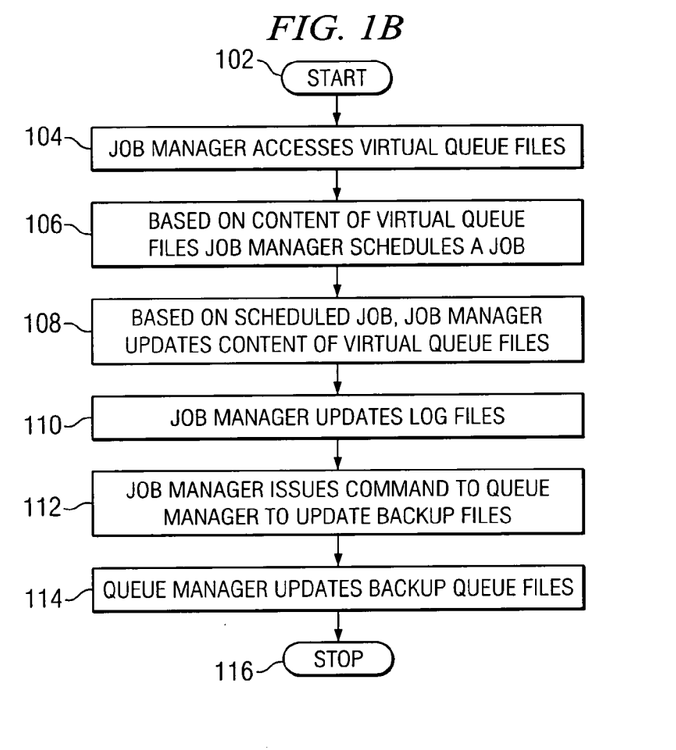
FIG. 1B is a flowchart illustrating example steps associated with a method for scheduling jobs according to the teachings of the invention.

FIG. 1B is a flowchart illustrating the operation of system 10 of FIG. 1A. The operation begins at step 102. At step 104, virtual job manager 20 accesses virtual queue files 22 to schedule execution of jobs. Based on the content of the virtual queue files 22, virtual job manager 20 schedules their execution at step 106. Upon execution of any particular job, virtual job manager 20 updates the content of virtual queue files 22 at step 108. For example, virtual job manager 20 may modify ready queue 28 to remove a job that has just begun to execute, and modify active queue 30 to place the newly executing job in active queue 30.

At step 110, virtual job manager 20 communicates over a link 49 with log file 16 to update log file 16. Using the above example, an entry in log file 16 would be added to indicate that execution of the particular job had begun. At step 112, virtual job manager 20 communicates a command over link 38 to instruct queue manager 24 to update the appropriate backup queue file 18. Using the above example, at step 114 an entry in ready queue 42 corresponding to the newly executing job is deleted and an entry in active queue 44 is added.

Thus, according to the teachings of the invention, backup queue files 18 stored external to virtual memory 12 are updated in response to a command from virtual job manager 20 such that backup queue files 18 store the same information as virtual queues 22. This is advantageous, in one embodiment, because it facilitates returning system 10 back to a current state in response to a failure of system 10, such as a power failure. Example steps associated with restoration of system 10 to its current state in response to a power failure are described in greater detail below in conjunction with FIG. 1C.

Figure 1C:
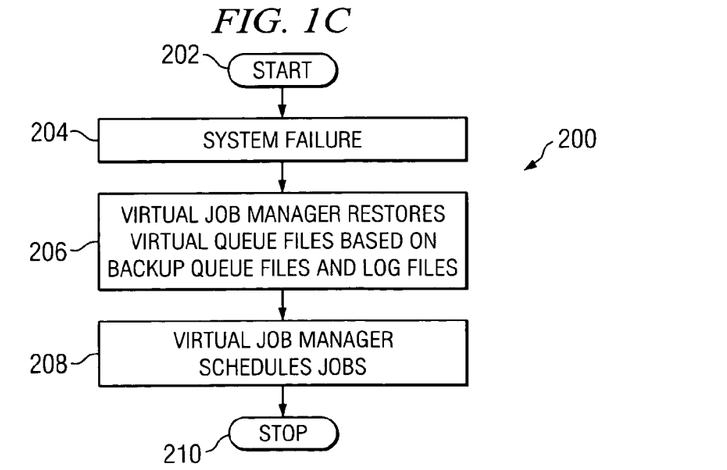
FIG. 1C is a flowchart illustrating example steps associated with updating the system of FIG. 1A in response to a failure.

FIG. 1C illustrates a method 200 illustrating example steps associated with restoring computer system 10 back to its current state after a failure, such as a power failure. The method begins at step 202. At step 204, while executing normally, a system failure occurs. At step 206, after system power has been restored and the system is ready to begin operating, virtual job manager 20 restores virtual queue files 22 back to the state they were when the power failure occurred. This involves reference to backup queue files 18 and log file 16. For example, backup queue files, which are stored on disk, tape, or other device not susceptible to power failure, will have been updated in response to commands from virtual job manager 20 and queue manager 24 to generally reflect the state of virtual queue files 22. Upon power failure the data stored in virtual queue files 22 will be destroyed, but may be rebuilt by copying the information in backup queue files 18.

Because there is some delay associated with updating backup queue files 18, as described above, backup queue files 18 will not necessarily identically represent the current status of virtual storage 12 upon a power failure. However, backup queue files 18 represent a state that is very close to the actual status of virtual queues 22 upon power failure. The status of virtual queue files 22 may further be refined by virtual job manager 20 referring to log file 16. Log file 16 may thus serve as the final fine tuning of the status of virtual queue files 22 that will allow restoration of virtual queue files 22 back to the state when the power failure occurred. It will be understood that because of inherent time delays associated with writing to disk storage, even log file 16 may not represent the exact state of virtual storage 12 that would occur just before a power failure.

Thus, a method and system are provided that allow for more rapid scheduling of jobs due to avoidance of reading from or writing to disk or tape storage to obtain information necessary to schedule a job before job scheduling can occur.

Figure 2:
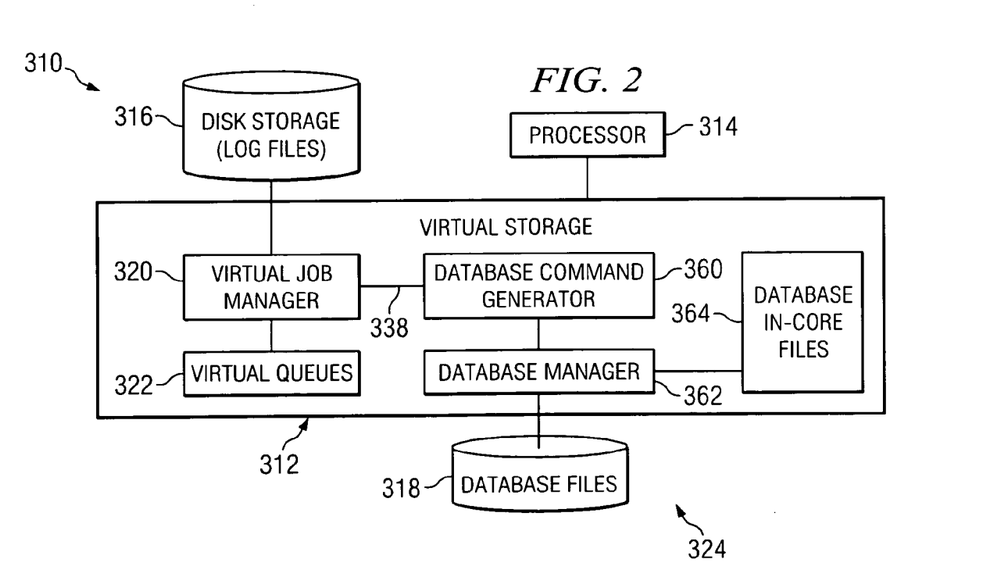
FIG. 2 is a block diagram illustrating a system for scheduling jobs in a computer system according to an alternative embodiment of the invention.

FIG. 2 is a block diagram illustrating a computer system 310 according to the teachings of another embodiment of the invention. Computer system 310 is analogous to computer system 10 of FIG. 1A. In particular, computer system 310 includes a virtual storage 312, a processor 314, a log file 316, and a plurality of database files 318. Processor 314 and log file 316 are analogous to processor 14 and log file 16. Virtual storage 312 is analogous to virtual storage 12, except that queue manager 24 has been replaced by portions of a database system 324. Computer system 312 also includes a database system 324, which includes, in this embodiment, a database command generator 360, a database manager 362, database in-core files 364, and database files 318.

The teachings of this embodiment of the invention recognize that instead of storing additional copies of queue files in a manner similar to virtual queue files 22, system 310 may make use of a database to store the underlying information of virtual queue files 322 but in an easier-to-use format. Many conventional computer systems may incorporate a database and database managers, which can be modified for use to provide backup to virtual queue files 322. Thus, database files 318 may store the underlying information stored in virtual queue files 322 instead of the use of backup queue files 18 of FIG. 1A.

Examples of database system 324 may include commercial databases such as Computer Associates Advantage CA-Datacomm/DB and IBM DB2. As illustrated, database system 324 may include a database command generator 360 and database manager 362. It is noted for completeness that certain files associated with database system 324 may be stored "in-core." Thus, upon a power failure, these files may also be retrieved from backup in database system files 318.

The operation of system 310 is analogous to that of system 10, except that in operation virtual job manager 320 issues a command 338 to database command generator 360 to update database disk file 318. In turn, database command generator 360 generates a command for database manager 362, such as an SQL command, that is transmitted to database disk files 318 updating database disk files 318 to accurately reflect the status of virtual queue files 322. After a power failure, virtual queue files 322 may be restored by reference to database disk files 318 and log files 316 in a manner analogous to that described above.

Figure 3A:
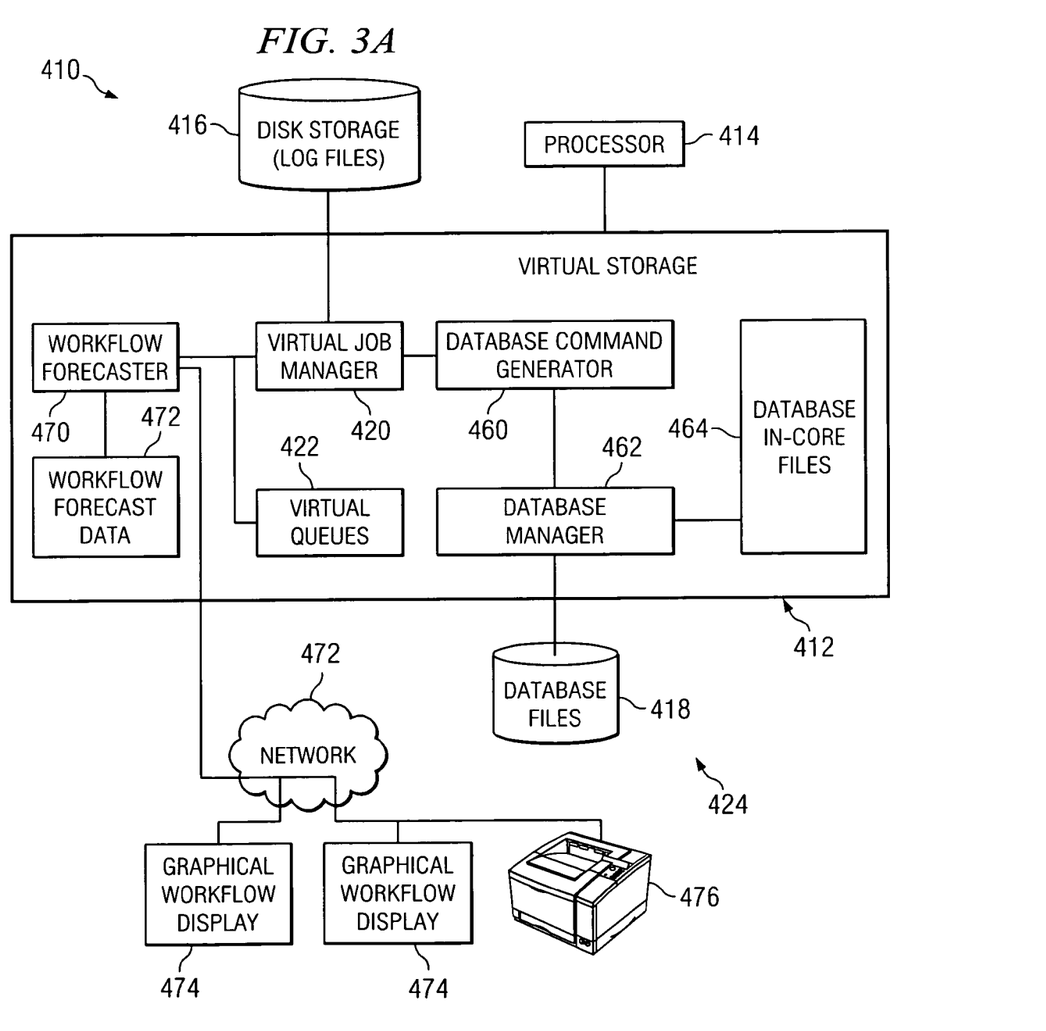
FIG. 3A is a block diagram illustrating a system for forecasting workflow according to yet another embodiment of the invention.

FIG. 3A is a block diagram illustrating a computer system 410 according to the teachings of another embodiment of the invention. Computer system 410 is analogous to computer system 10 of FIG. 1A and computer system 310 of FIG. 2. In particular, computer system 410 includes a virtual storage 412, a processor 414, a log file 416, and a plurality of database files 418. Processor 414 and log file 416 are analogous to processor 14, 314 and log file 16, 316. Virtual storage 412 is analogous to virtual storage 312. Computer system 410 also includes a database system 424 analogous to database system 324. Database system 424 includes, in this embodiment, a database command generator 416, a database manager 462, database in-core files 464, and database files 418. It will be understood that database system 424 could be replaced, in this embodiment, by backup queue files 18 in an analogous manner to that described above in conjunction with FIG. 1A.

Computer system 410 also includes a workflow forecaster 470. In this embodiment, workflow forecaster is software operable to access virtual queue files 422 and generate a workflow forecast for one or more particular jobs. In particular, a description of all jobs and datasets spawned by one or more particular jobs in virtual queues may be generated, as described in greater detail below. Computer system 410 also includes a plurality of graphical workflow displays 474 coupled to workflow forecaster 470 through a network 472. Graphical workflow displays 474 may be any suitable display for displaying a graphical representation of a workflow forecast generated by workflow forecaster 470. Network 472 may be any suitable network for communicating a workflow forecast generated by workflow forecaster 470 to graphical workflow display 474.

Figure 3B:
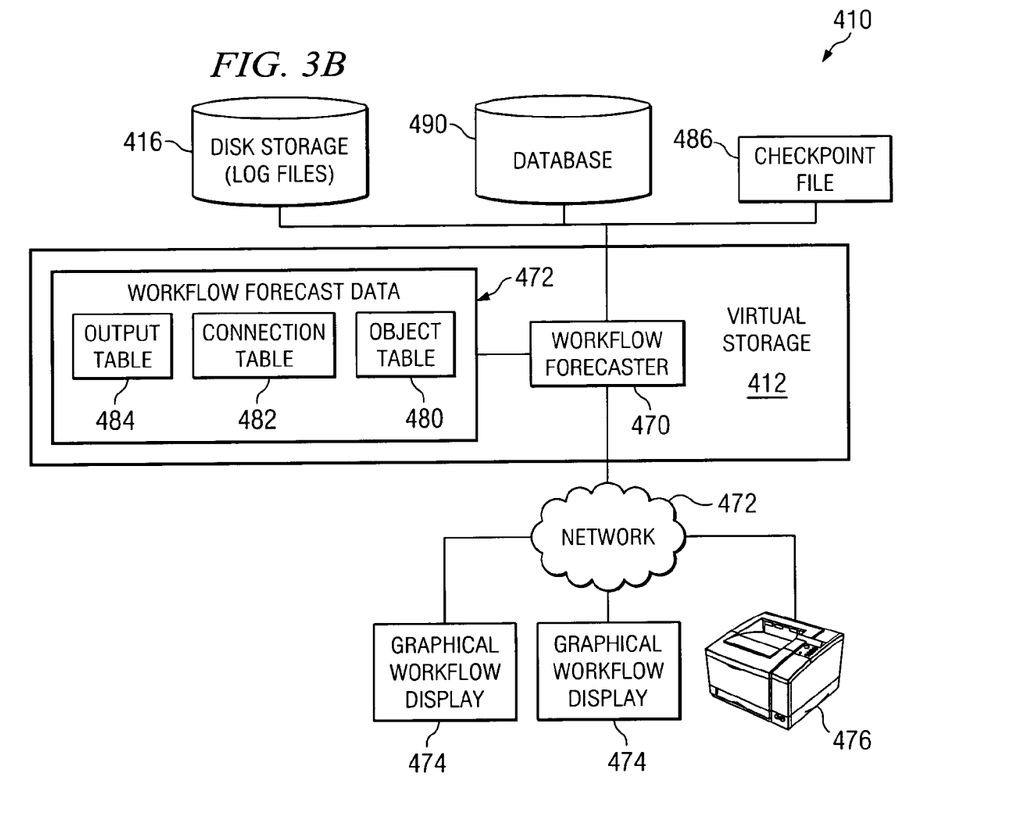
FIG. 3B is a block diagram illustrating a system for forecasting workflow according to yet another embodiment of the invention.

The teachings of this embodiment of the invention recognize that generating a workflow forecast for a particular job requires access to the job queue files in virtual queues 422 and, in some embodiments, data stored in an associated database, such as database 490 (FIG. 3B). Teachings of this embodiment of the invention recognize that accessing such queue files in conventionally stored disks is time consuming. Thus, conventionally job forecasting was performed only upon request by a user and did not include forecasting datasets spawned or required by a particular job. The teachings of this embodiment of the invention recognize that by moving at least some of such job queues into random access memory, and storing them as virtual queues 422, that workflow forecasting may take place automatically because of the relative ease in accessing virtual queues 422. Thus, workflow forecaster 470 may generate a workflow forecast for every job in virtual queues 422 without waiting for a request for such a workflow forecast from a user. To facilitate this, in one embodiment, workflow forecaster 470 is a separate program independent of virtual job manager 420. Additional details of this embodiment of the invention are described in greater detail in conjunction with FIGS. 3B through 4B.

FIG. 3B is a block diagram illustrating additional details of computer system 410. Workflow forecaster 470 uses data from virtual queues 422 (FIG. 3A) and in some instances an associated database 490 to make predictions about what jobs will be run between given starting and ending points, referred to as the span. The span may be any desired time period, such as a day or a week. Workflow forecaster 470 places each job and dataset object within the span into object table 480. As used herein, 'job object' refers to the name and properties of a job and 'dataset object' refers to the name and properties of a dataset. These objects are sometimes known as anchors. The connections between the objects (e.g., the fact that a JOB A triggers JOB B) are placed in connection table 482. Object table 480 and connection table 482 can remain static or, in another embodiment, can be updated dynamically. Object table 480 and connection table 482 reside in virtual storage 412 to provide manageable access time that allows workflow forecaster 470 to continually update object table 480 and connection table 482 without the delay associated with accessing disks. Locating virtual queues 422 in virtual storage 412 also allows construction and updating of connection table 482 and object table 480 without the delay that would be present if all such queue files were located external to virtual storage 412 on disk.

Workflow forecaster 470 makes copies of the object table 480 and connection table 482 to a checkpoint file 486 at regular intervals in one embodiment. In the event of system failure, such as power loss, after the system has been restored, workflow forecaster 470 can recover the object table 480 and connection table 482 using data from checkpoint file 486 and log file 416. Checkpoint file 486 would be used to recover the tables up to the point when the last checkpoint was taken, and log file 416 data would be used to forward recover the tables from that point up to the point when the system failure occurred.

Upon request, workflow forecaster 470 uses information in object table 480 and connection table 482 to build a description of all jobs and datasets spawned by a particular job (or set of particular jobs). This description is stored in output table 484, represented by FIG. 4A, which is then formatted specifically for the requestor and may be sent through network 472 to a plurality of graphical workflow displays 474, or which may be printed by a plurality of graphical printing or plotting devices represented in FIG. 3B as printer 476.

Database 490 may store environment definitions defined by a user regarding when jobs are scheduled to run and other associated data. This information may be used by workflow forecaster 470 in originally constructing connection table 482 and object table 480, while virtual queues 422 (FIG. 3A) are accessed to update connection table 482 and object table 480. In some instances database 490 may also be accessed to update connection table 482 and object table 480. Database 490 is illustrated in FIG. 3B as being external to virtual storage 412 in this embodiment. However, in other embodiments database 490 may be located within virtual storage 412. Locating database 490 within virtual storage 412 provides the additional advantage of reducing access time, furthering rapid updating of connection table 482 and output table 480 (when such updating uses database 490).

Figure 4A:
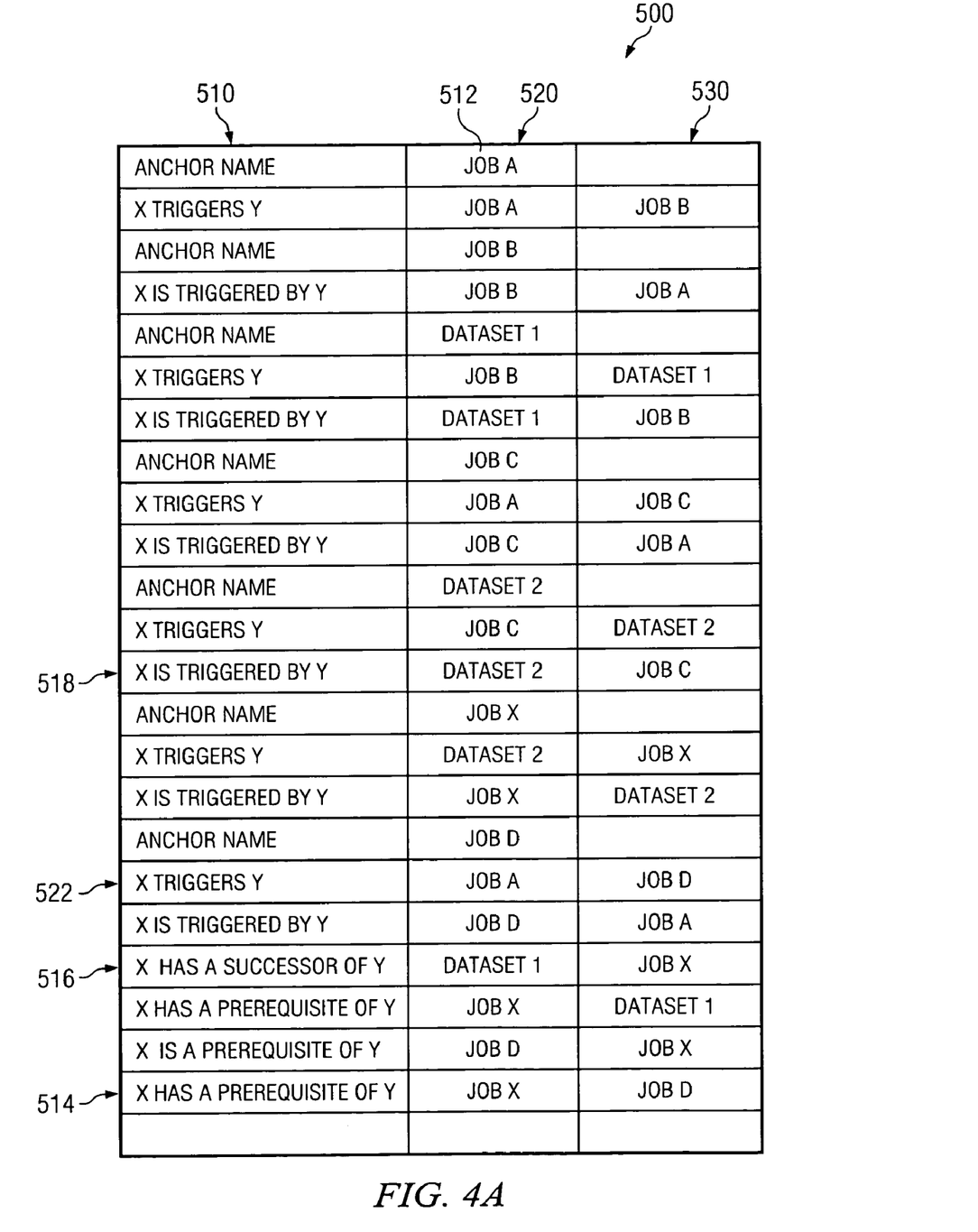
FIG. 4A is a chart illustrating stored relationships between jobs and datasets used by the system of FIGS. 3A and 3B for generating workflow forecasts.

FIG. 4A is a chart 500 illustrating an example representation of relationships between a plurality of example jobs and datasets. Chart 500 represents information that may be stored in virtual queues 422 and in some instances database 490 and which may be accessed at any suitable time by workflow forecaster 470 in order to generate a workflow forecast for a particular job. As described above, it is believed that conventionally workflow forecasts are generated only in response to a user requesting such a workflow forecast and such workflow forecast did not include forecasts of datasets, but were limited to forecast of jobs. As used herein, datasets refers to files or sets of data that may be used or produced by a particular job.

Chart 500 includes, in this embodiment, three columns 510, 520, and 530. Column 510 includes an identifier providing an indication of significance of the next two columns. In this embodiment, there are five possible identifiers. Identifiers 510 may include an anchor name, a prerequisite, a successor, an X triggers Y identifier, and an X is triggered by Y identifier. Anchor name refers to the name of a particular job for which additional information will be described in subsequent rows. As one example, the first row of chart 500 has an element 512 having an anchor name "JOB A". The prerequisite identifier indicates that the job or dataset in column 520 has a prerequisite of the job or dataset in column 530. An example of this identifier and associated jobs is illustrated in row 514. In that example, JOB X has a prerequisite of JOB D. The successor identifier indicates that the job or dataset in column 520 is a prerequisite of the job or dataset in column 530. An example of the successor identifier is illustrated in row 516 in which the dataset identified by DATASET 1 is a prerequisite for the job identified by JOB X. The X triggers Y identifier indicates that the job or dataset in column 520 is triggered by the job or dataset in column 530. The row 518 provides an example of such an identifier in which the dataset identified by DATASET 2 is triggered by the job identified by JOB C. The X is triggered by Y identifier indicates that the job or dataset in column 520 triggers the job or dataset in column 530. Row 522 provides an example in which the job identified as JOB A triggers the job identified as JOB D.

The use of this information stored in chart 500 is described with reference to FIG. 4B.

Figure 4B:
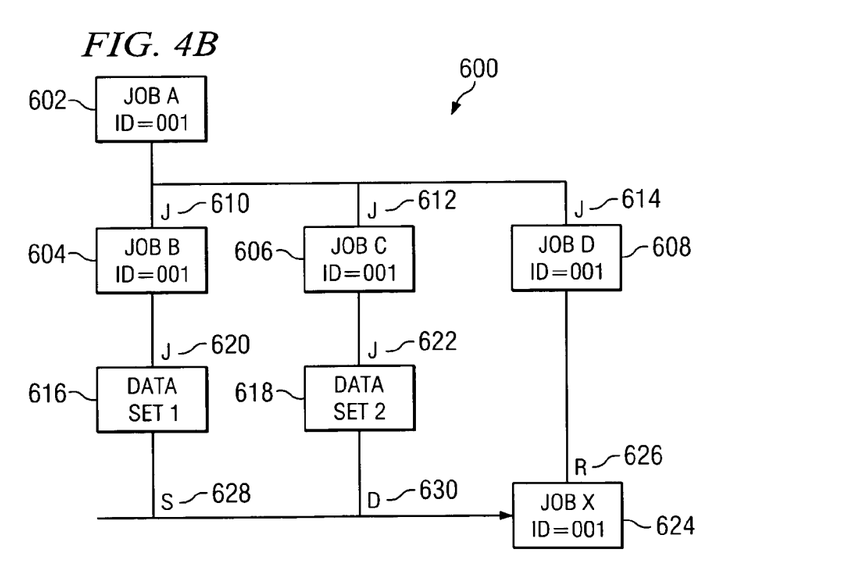
FIG. 4B is an example graphical depiction of a workflow forecast generated by the system of FIG. 3.

FIG. 4B shows an example workflow forecast that may be generated by workflow forecaster 470 and displayed on graphical workflow display 474 or printed on printer 476 of FIG. 3B. Workflow forecast 600 begins with an anchor job 602. Thus workflow forecast 600 graphically displays all jobs spawned by JOB A 602 and all datasets spawned by JOB A 602, as well as all jobs required by such spawned jobs and datasets and any associated prerequisites.

As illustrated, job forecast 600 illustrates three jobs directly spawned by JOB A 602. Those jobs are JOB B 604, JOB C 606, and JOB D 608. In addition to showing the particular jobs and datasets, workflow forecast 600 illustrates relationships between jobs. For example, JOB B 604 is indicated to have been triggered by job 602 by the letter J positioned at the link between JOB A 602 and JOB B 604, as indicated by reference numeral 610. Similarly JOB C 606 and JOB D 608 are indicated to be triggered by JOB A 602, a shown by reference numerals 612 and 614.

As described above, in addition to illustrating jobs associated with a particular anchor job, workflow forecast 600 also generates and illustrates datasets associated with a particular job. In this example, workflow forecast includes an identification of DATASET 1 illustrated by reference numeral 616, and DATASET 2 as illustrated by reference numeral 618. In this example DATASET 1 is triggered by JOB B 604, as indicated by reference numeral 620, and DATASET 2 is triggered by JOB C 606, as indicated by reference numeral 622. In this example each job also includes an identification number, in this case "001" which identifies information specific to how the job is defined to the system. Other information associated with each job may also be provided. Workflow forecast 600 also includes an identification of JOB X 624. As illustrated, JOB D 608 is indicated to be a requirement for JOB X 624 to execute as indicated by reference numeral 626. In addition, DATASET 1 is indicated to be a dataset requirement of JOB X 624, as indicated by reference numeral 628. Finally, DATASET 2 618 triggers the execution of JOB X 624, as indicated by reference numeral 630.

Thus, a workflow forecast 600 for a JOB A 602 is provided that includes all jobs and datasets spawned by JOB A 602, as well as, in this example, a description of the relationships between the various jobs and datasets. According to the teachings of one aspect of the invention workflow forecast 600 is generated without request from a user, but rather generated automatically for all jobs in the request, ready and active queues. This is facilitated by storing information regarding jobs, such as some of the information in chart 500 in job queue files in virtual storage rather than disk storage. This allows ready access to such information needed to produce the forecast, without time-consuming disk access. Further, because of this ready access to information, datasets can also be included in job forecast without detrimentally affecting system performance. The provision of a separate workflow forecaster separate from the job manager also facilitates the workflow forecast generation process.

In operation, workflow forecast 600 may be displayed on graphical workflow display 474 in response to a user requesting such display, but the workflow forecast 600 will have already been generated, allowing more rapid display to the user.

Although the present invention has been described with several embodiments, a myriad of changes, variations, alterations, transformations, and modifications may be suggested to one skilled in the art, and it is intended that the present invention encompass such changes, variations, alterations, transformations, and modifications as they fall within the scope of the appended claims.

What is claimed is:

1. A method for scheduling jobs in a computer system comprising:
   storing a plurality of job queue files in random access memory, the plurality of job queue files comprising information associated with at least one job;
   also storing the information external to the random access memory;
   accessing at least one of the job queue files stored in the random access memory;
   scheduling, based at least in part on the at least one job queue file, execution of a job associated with the at least one job queue file;
   in response to the scheduling, updating the information stored in the job queue file in random access memory and the information stored external to the random access memory; and
   in response to a system failure, restoring the plurality of job queue files in the random access memory, wherein restoring comprises copying the information stored external to the random access memory into the plurality of job queue files in random access memory.

2. The method of claim 1, wherein also storing the information external to the random access memory comprises also storing the information in a plurality of queue files on disk external to the random access memory.

3. The method of claim 1, wherein also storing the information external to the random access memory comprises also storing the information in database files on disk external to the random access memory.

4. The method of claim 3, wherein the database files comprise Computer Associates Advantage CA-Datacomm/DB database files.

5. The method of claim 3, wherein the database files comprise IBM DB2 files.

6. The method of claim 1, wherein updating the information stored external to the random access memory comprises generating an SQL command.

7. The method of claim 1, wherein updating the information stored external to the random access memory comprises updating the information stored external to the random access memory by a command that is the same as a command used to update the information stored in the random access memory.

8. The method of claim 1, and further comprising maintaining a log file comprising status information regarding scheduled jobs.

9. A system for scheduling computer jobs comprising:
   a processor;
   random access memory accessible by the processor, the random access memory storing a job manager and a plurality of job queue files, the job queue files comprising information regarding a plurality of jobs, the job manager operable, when executed on the processor, to schedule a job and, in response, update at least one job queue file associated with the scheduled job;
   backup memory external to the random access memory also storing the information regarding a plurality of jobs;
   a backup manager stored in the random access memory, the backup manager operable to update the information stored in the backup memory regarding a scheduled job in response to a command from the job manager; and
   the backup manager further operable, in response to a system failure, to restore the plurality of job queue files in the random access memory, wherein restoring comprises copying the information stored in the backup memory into the plurality of job queue files in random access memory.

10. The system of claim 9, wherein the backup memory comprises a plurality of queue files.

11. The system of claim 9, wherein the backup memory comprises a portion of a database.

12. The method of claim 11, wherein the database is a Computer Associates Advantage CA-Datacomm/DB database.

13. The method of claim 11, wherein the database is an IBM DB2 database.

14. The method of claim 9, wherein the backup manager is a queue manager.

15. The system of claim 9, wherein the backup manager is a database manager.

16. The system of claim 9, and further comprising a log file stored external to the random access memory, the log file comprising information regarding the status of a plurality of jobs executed by the processor.

* * * * *